(12) United States Patent
Murashige et al.

(10) Patent No.: US 8,127,617 B2
(45) Date of Patent: Mar. 6, 2012

(54) PRESSURE SENSOR, MANUFACTURING METHOD THEREOF, AND ELECTRONIC COMPONENT PROVIDED THEREWITH

(75) Inventors: Sinichi Murashige, Sakura (JP); Satoshi Yamamoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 6 days.

(21) Appl. No.: 12/426,535

(22) Filed: Apr. 20, 2009

(65) Prior Publication Data

US 2009/0266170 A1 Oct. 29, 2009

(30) Foreign Application Priority Data

Apr. 24, 2008 (JP) ................. 2008-114263

(51) Int. Cl.
*G01L 7/08* (2006.01)
(52) U.S. Cl. ......................................................... 73/715
(58) Field of Classification Search ...................... 73/715
See application file for complete search history.

(56) References Cited

U.S. PATENT DOCUMENTS

| | | | |
|---|---|---|---|
| 5,491,172 A | 2/1996 | Lee et al. | |
| 6,028,358 A | 2/2000 | Suzuki | |
| 6,998,486 B2 | 2/2006 | Shibuya et al. | |
| 2003/0232809 A1 | 12/2003 | Terashita et al. | |
| 2005/0205950 A1 | 9/2005 | Kondo et al. | |
| 2006/0151203 A1 | 7/2006 | Krueger et al. | |
| 2007/0113661 A1 | 5/2007 | Benzel et al. | |
| 2007/0176272 A1 | 8/2007 | Saitoh et al. | |
| 2007/0275495 A1 | 11/2007 | Mayer et al. | |
| 2008/0029852 A1 | 2/2008 | Murayama et al. | |
| 2008/0128840 A1 | 6/2008 | Benzel | |

FOREIGN PATENT DOCUMENTS

| | | |
|---|---|---|
| CA | 2290744 A1 | 12/1998 |
| DE | 102 38 523 A1 | 3/2004 |
| DE | 10-2004-051468 A1 | 4/2006 |
| EP | 0987254 A1 | 3/2000 |
| EP | 1826543 A2 | 8/2007 |
| JP | 11-326088 A1 | 11/1999 |
| JP | 2007-248212 A | 9/2007 |
| WO | 94/26702 A1 | 11/1994 |
| WO | 03/057675 A1 | 7/2003 |

OTHER PUBLICATIONS

U.S. Appl. No. 12/427,954, Apr. 2009, Yamamoto, Satoshi.*

(Continued)

*Primary Examiner* — Jewel Thompson
(74) *Attorney, Agent, or Firm* — Westerman, Hattori, Daniels & Adrian, LLP

(57) ABSTRACT

A pressure sensor which includes: a semiconductor substrate; a first cavity portion that spreads out approximately parallel with one surface of the semiconductor substrate in the interior of a central region thereof; a diaphragm portion of a thin plate shape that is positioned on one side of the first cavity portion; a pressure sensitive element that is disposed on the diaphragm; and a bump that is disposed in an outer edge region of the one surface of the semiconductor substrate that excludes the diaphragm portion and is electrically connected with the pressure sensitive element, wherein a second cavity portion is disposed in at least one portion of the outer edge region in the interior of the semiconductor substrate and is closed with respect to the one surface of the semiconductor substrate.

7 Claims, 9 Drawing Sheets

OTHER PUBLICATIONS

S. Armbruster et al., "A Novel Micromachining Process for the Fabrication of Monocrystalline SI-Membranes Using Porous Silicon", Digest of Technical Papers Transducers, Mar. 2003, p. 246-249.

Hanke, H et al.; "The Discovery of the Pathophysiological Aspects of Atherosclerosis-A Review."; Acta chir belg, 2001, vol. 101, pp. 162-169.

Bocan et al.; "Comparison of CI-976, an ACAT Inhibitor, and Selected Lipid-Lowering Agents for Antiatherosclerotic Activity in Iliac-Femoral and Thoracic Aortic Lesions. A biochemical, morphological, and morphometric evaluation"; Arterioscler Thromb Vasc Biol., vol. 11, No. 6, Nov./Dec. 1991, pp. 1830-1843.

Bocan et al.; "The ACAP Inhibitor Avasimibe Reduces Macrophages and Matrix Metalloproteinase Expression in Atherosclerotic Lesions of Hypercholesterolemic Rabbits"; Arterioscler Thromb Vasc Biol., Jan. 2000, pp. 70-79.

Cook, John P.; "The pathophysiology of peripheral arterial disease: rational targets for drug intervention."; Vascular Medicine, 1997, vol. 2: pp. 227-230.

Canadian Office Action dated Nov. 5, 2007, issued in corresponding Canadian Patent Application No. 2,535,920.

Chinese Office Action dated Jul. 6, 2007, issued in corresponding Chinese Patent Application No. 200480024894.2.

Y. Nakashima, et al.; "ApoE-Deficient Mice Develop Lesions of All Phases of Atherosclerosis Throughout the Arterial Tree"; Arteriosclerosis, Thrombosis, and Vascular Biology, Journal of the American Heart Association, Jan. 1994, pp. 133-140, vol. 14, No. 1.

Florian Bea, et al.; "Simvastatin Promotes Atherosclerotic Plaque Stability in ApoE-Deficient Mice Independently of Lipid Lowering"; Antherosclerosis and Lipoproteins, Arterioscler Thromb Basc Biol., Nov. 2002, pp. 1832-1837.

Rodriguez, A. et al.; "Anti-atherogenic effects of the acyl-CoA: cholesterol acyltransferase inhibitor, avasimibe (CI-1011), in cultured primary human macrophages."; Atherosclerosis, vol. 161 (2002), pp. 45-54.

Giovannoni, M.P. et al.; "Selective ACAT Inhibitors as Promising Antihyperlipidemic, Antiatherosclerotic and Anti-Alzheimer Drugs"; Mini Reviews in Medicinal Chemistry, 2003, vol. 3, No. 6, pp. 576-584.

International Search Report of PCT/JP2004/011935, mailed Nov. 30, 2004.

Libby, P. et al., "Macrophages and Atherosclerotic Plaque Stability"; Curr Opin Lipidol. Oct. 1996; 7(5):330-5).

Milita, Crisby MD, et al.; "Pravastatin Treatment Increases Collagen Content and Decreases Lipid Content, Inflammation, Metalloproteinases, and Cell Death in Human Carotid Plaques Implications for Plaque Stabilization"; Pravastatin Alters Carotid Plaque Composition, Circulation Feb. 20, 2001, pp. 926-933.

Russian Office Action dated Jul. 1, 2008, issued in corresponding Russian Patent Application No. 2006110035/14 (010896).

Shevchenko; "Cardiology"; Moscow, 2006, Moscow Information Agency MIA, p. 305.

US Office Action dated Jul. 23, 2010 for U.S. Appl. No. 12/427,954.

European Search Report dated Mar. 22, 2011, issued in corresponding European Patent Application No. 09251157.5.

European Search Report dated Mar. 22, 2011, issued in corresponding European Patent Application No. 09251156.7.

\* cited by examiner

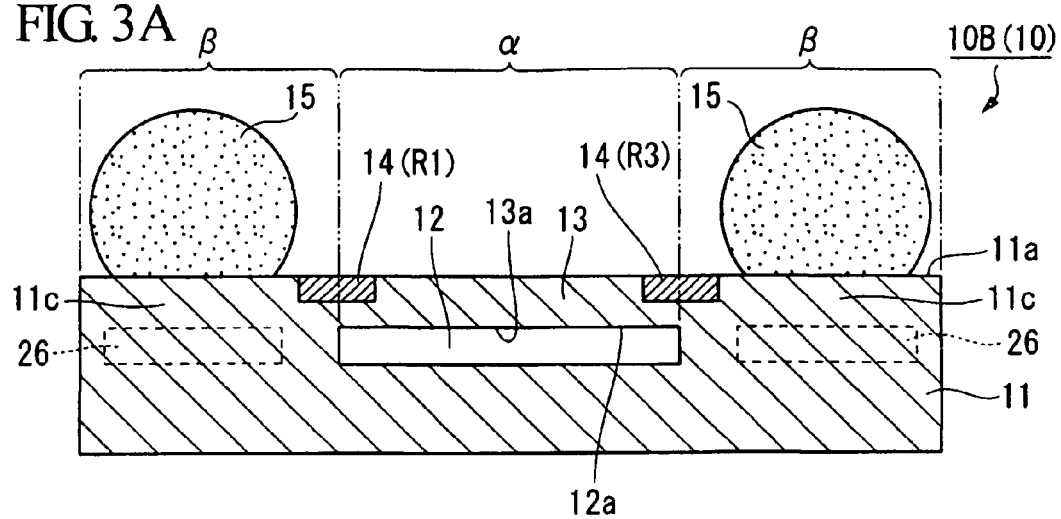
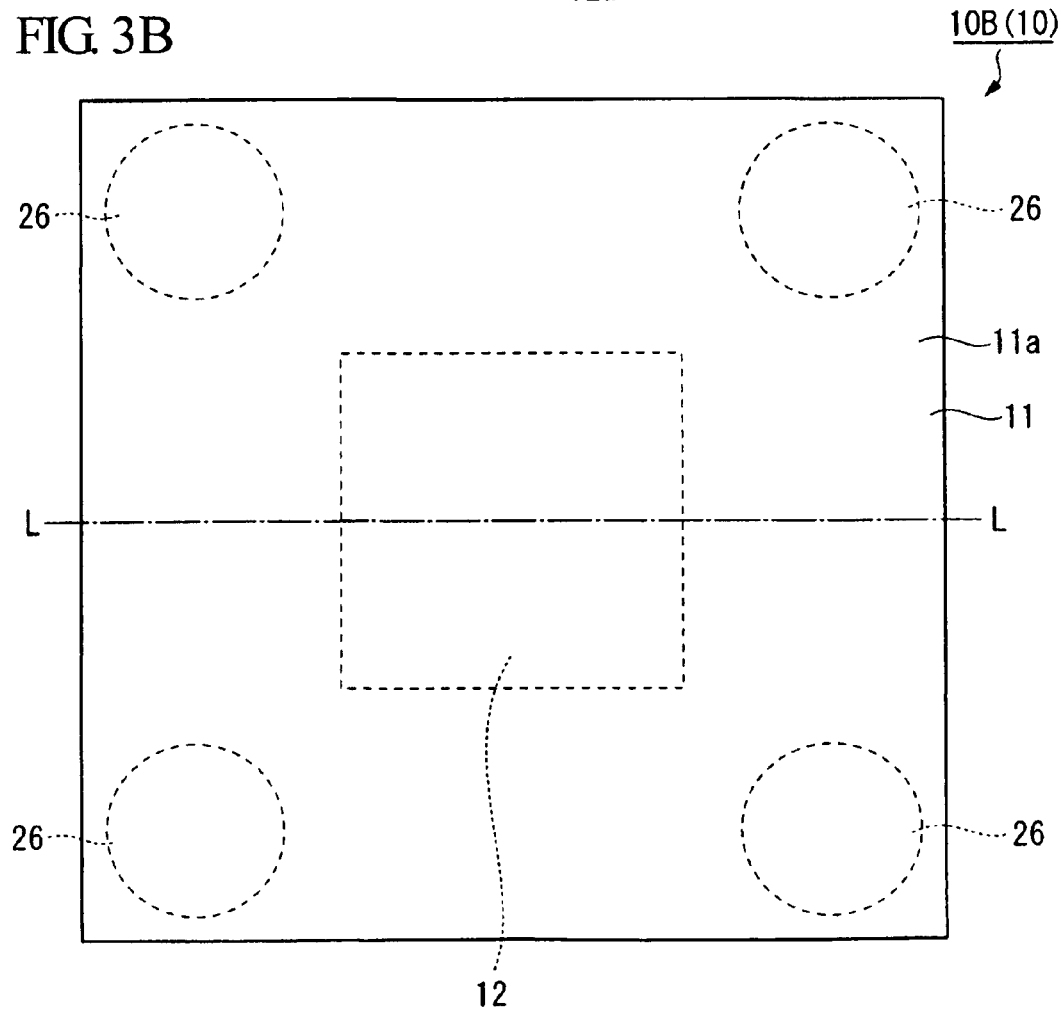

PRESSURE SENSOR, MANUFACTURING METHOD THEREOF, AND ELECTRONIC COMPONENT PROVIDED THEREWITH

BACKGROUND OF THE INVENTION

1. Field of the Invention

The present invention relates to a pressure sensor, and in more detail to a pressure sensor in which stress that arises other than due to the pressure to be measured is relieved and characteristic fluctuations hardly occur, a manufacturing method thereof, and an electronic component that is provided with the pressure sensor.

Priority is claimed on Japanese Patent Application No. 2008-114263, filed Apr. 24, 2008, the content of which is incorporated herein by reference.

2. Description of Related Art

A conventional semiconductor pressure sensor 110 as shown for example in FIG. 9A has gauge resistors 112 disposed in a surface 111a of a silicon substrate 111 that has a plane orientation of (100) or (110) and constitutes an electrical circuit by connecting them to a Wheatstone bridge, whereby an electrode for input/output to a pressure sensor is formed. Thereafter, using a strong alkali solution, anisotropic etching is performed from the back surface 111b of the silicon substrate 111, whereby a diaphragm 113 is formed that becomes a mechanically moving portion for detecting pressure changes. This kind of fabrication process is a method that has been generally performed in a conventional pressure sensor, but in the formation process of the diaphragm 113, due to the existence of a gradient angle on the silicon etching surface 114, there has been a limit to miniaturization of the pressure sensor. Also, although the process until the formation of the diaphragm 113 is performed in the wafer state, thereafter it is cut into small pieces as pressure sensor chips and placed in packages of resin or the like. For that reason, when mounting on a substrate like printed circuit board for placing in an electronic device, a wider mounting area has been needed.

In recent years, in order to meet the demand for miniaturization of pressure sensors, a micro pressure sensor 120 has been proposed that has a diaphragm portion 123 that forms a vacuum reference pressure chamber (cavity) 122 having a height of a few μm in a silicon substrate 121, as shown in FIG. 9B. This pressure sensor 120 is shown as a chip size package pressure sensor as disclosed for example in Patent Document "Japanese Unexamined Patent Application, First Publication No. 2007-248212". In the structure that is disclosed in the Patent Document, members such as a ceramic package or resin package that contains the pressure sensor that is required for a conventional pressure sensor package and metal wiring that electrically connects the pressure sensor and external substrate, and leads can be completely eliminated. Also, when forming the diaphragm portion 123, it can be made small and thin because there is no need to form it in a thin manner by etching the semiconductor substrate 121 from the back side 121b of the surface 121a of the semiconductor substrate 121 on which piezoresistors 124 are arranged.

However, although the pressure sensor that has the structure illustrated in FIGS. 9A and 9B have a major merit from the viewpoint of miniaturization, a number of problems remain as shown below regarding the characteristics of the pressure sensor after mounting.

1: There is the risk of undesirable characteristic fluctuations occurring in the pressure sensor due to residual stress immediately after mounting.

2: There is the risk of undesirable characteristic fluctuations occurring in the pressure sensor under the effect of the thermal stress produced between mounting substrates by a temperature change.

3: There is the risk of undesirable characteristic fluctuations occurring in the pressure sensor owing to mechanical external factors, such as deformation, vibration, or the like of the substrate.

Regarding the abovementioned problem 1, since bonding of the mounting substrate and the joining bumps 125 is performed via a reflow process at 200 degrees C. or higher, in the process of cooling until room temperature, stress builds up due to the difference of coefficient of thermal expansion (CTE) between the mounting substrate and the pressure sensor chip. Owing to this accumulated stress, there is the risk of characteristic fluctuations occurring in the pressure sensor. Since the material that is used for the joining bumps 125 is a low melting-point material, temporal changes such as creep deformation or the like occur even in the room temperature. As a result, even if left standing at room temperature after mounting the joining bumps 125 on the substrate, the residual stress that acts on the pressure sensor changes over time. Accordingly, there is the risk of characteristic fluctuations occurring in the pressure sensor.

Regarding the abovementioned problem 2 after once cooling following mounting, due to thermal stress that is produced by changes in the surrounding temperature, there is the risk of characteristic fluctuations occurring in the pressure sensor. This is also caused by a difference of CTE between the substrate and the sensor chip.

The abovementioned problem 3 concerns characteristic fluctuations of a pressure sensor caused by stress that is applied due to mechanical factors such as substrate deformation, vibration, and dropping which a substrate in which a pressure sensor is mounted may be subjected to during use or transport.

In the case of any of problems 1 to 3, the cause of the characteristic fluctuations of the pressure sensor are due to stresses that cause pressure fluctuations other than the pressure to be measured acting on the gauge resistors on the diaphragm. Those stresses are transmitted to the pressure sensor from the mounting substrate via the bumps.

The present invention was achieved in view of the abovementioned circumstances, and has as its object to provide a pressure sensor that can suppress stresses that cause pressure fluctuations other than the pressure to be measured and hinder output characteristic fluctuations of the pressure sensor.

SUMMARY OF THE INVENTION

A pressure sensor in accordance with a first aspect of the present invention includes: a semiconductor substrate; a first cavity portion that spreads out approximately parallel with one surface of the semiconductor substrate in the interior of a central region thereof; a diaphragm portion of a thin plate shape that is positioned on one side of the first cavity portion; a pressure sensitive element that is disposed on the diaphragm; and a bump that is disposed in an outer edge region of the one surface of the semiconductor substrate that excludes the diaphragm portion and is electrically connected with the pressure sensitive element, in which a second cavity portion is disposed in at least one portion of the outer edge region in the interior of the semiconductor substrate and is closed with respect to the one surface of the semiconductor substrate.

A pressure sensor in accordance with a second aspect of the present invention is the pressure sensor according to the first aspect, in which the second cavity portion is disposed at a position that overlaps at least the bump when viewed from the one surface of the semiconductor substrate.

A pressure sensor in accordance with a third aspect of the present invention is the pressure sensor according to the second aspect, in which the second cavity portion opens to a side surface of the semiconductor substrate.

A pressure sensor in accordance with a fourth aspect of the present invention is the pressure sensor according to the first aspect, in which the second cavity portion is disposed between the diaphragm portion and the region where the solder bump is disposed.

A pressure sensor in accordance with a fifth aspect of the present invention is the pressure sensor according to the fourth aspect, in which the second cavity portion is disposed in the interior of the semiconductor substrate so as to surround the region where the solder bump is disposed on the one surface of the semiconductor substrate.

An electronic component in accordance with a sixth aspect of the present invention is mounted with the pressure sensor recited in any one of the pressure sensors in accordance with the first to the fifth aspect.

A method of manufacturing a pressure sensor in accordance with a seventh aspect of the present invention is a method of manufacturing a pressure sensor including: a semiconductor substrate; a first cavity portion that spreads out approximately parallel with one surface of the semiconductor substrate in the interior of a central region thereof; a diaphragm portion of a thin plate shape that is positioned on one side of the first cavity portion; a pressure sensitive element that is disposed on the diaphragm; and a bump that is disposed in an outer edge region of the one surface of the semiconductor substrate that excludes the diaphragm portion and is electrically connected with the pressure sensitive element, in which a second cavity portion is disposed in at least one portion of the outer edge region in the interior of the semiconductor substrate and is closed with respect to the one surface of the semiconductor substrate, which includes: a process that forms the first cavity portion, the second cavity portion, and the diaphragm portion in the semiconductor substrate; a process that forms the pressure sensitive element on the diaphragm portion; and a process that forms the solder bump that is electrically connected to the pressure sensitive element on the one surface of the semiconductor substrate.

According to the pressure sensor of the present invention, it is possible to relieve stress that causes pressure fluctuations other than the pressure to be measured that is transmitted via the bump by the second cavity portion being disposed in the outer edge region of the interior of the semiconductor substrate. Accordingly, it is possible to provide a pressure sensor having little characteristic fluctuation.

BRIEF DESCRIPTION OF THE DRAWINGS

FIG. 3A is a cross-sectional view schematically showing one example of a pressure sensor in accordance with a second embodiment of the present invention.

FIG. 3B is a plain view schematically showing one example of a pressure sensor in accordance with a second embodiment of the present invention.

DETAILED DESCRIPTION OF THE INVENTION

Hereinbelow the present invention shall be described in detail with reference to the appended drawings, however, the present invention is not limited thereto and various modifications can be made without departing from the spirit or scope of the present invention.

First Embodiment

Pressure Sensor

Figure 1A:
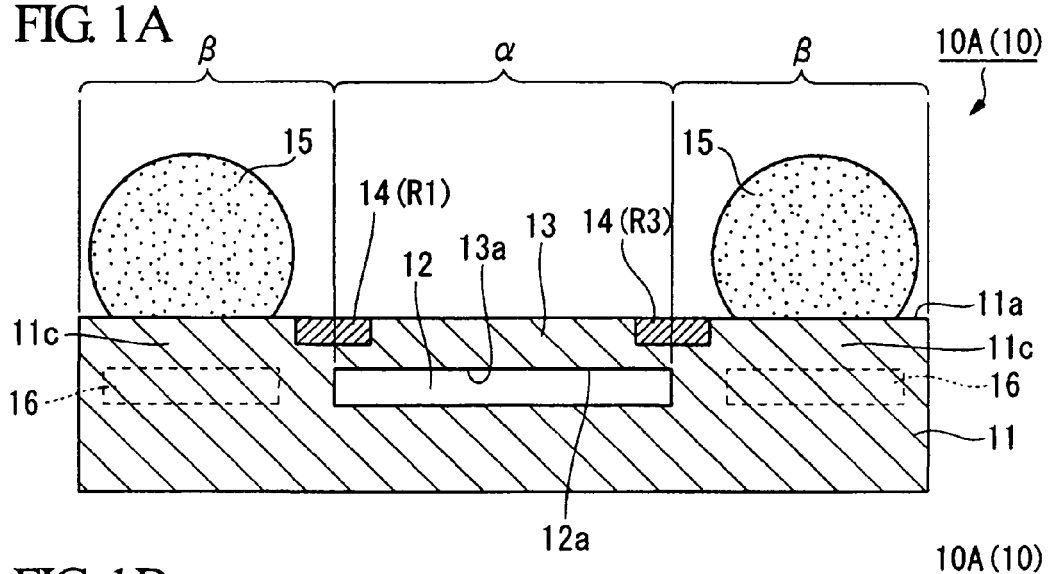
FIG. 1A is a cross-sectional view schematically showing one example of a pressure sensor in accordance with a first embodiment of the present invention.
Figure 1B:
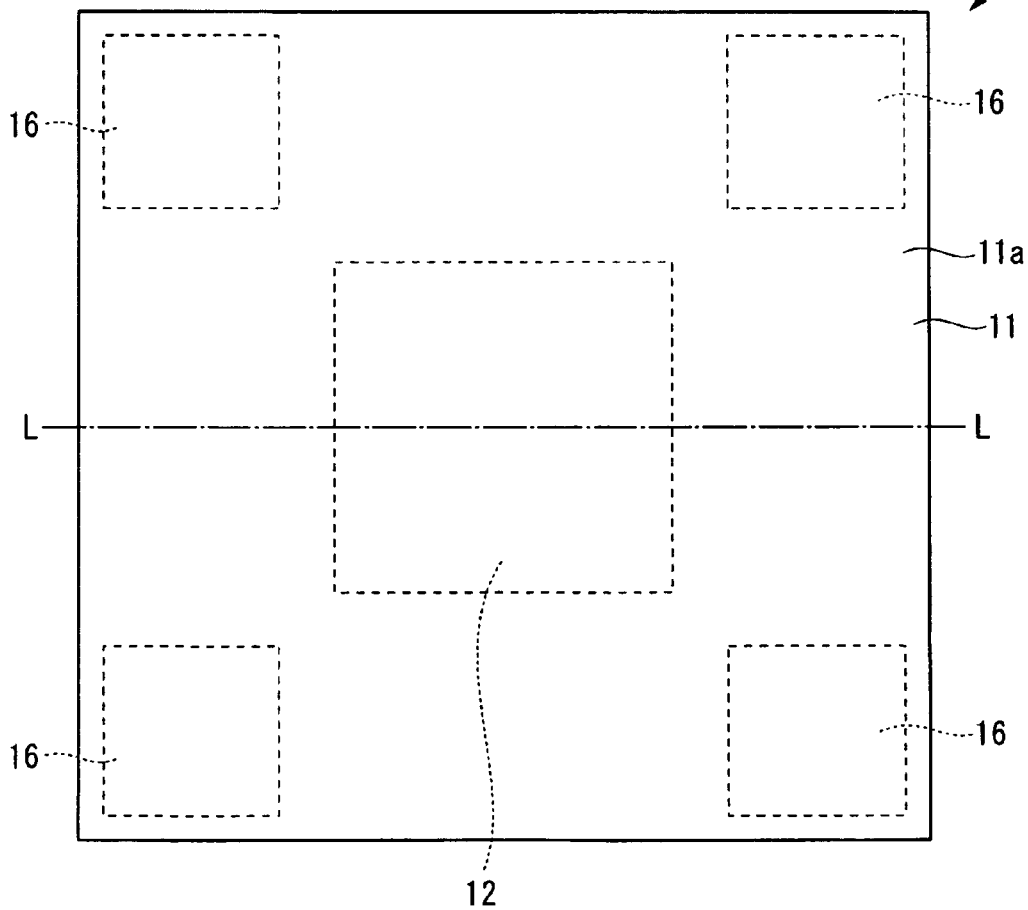
FIG. 1B is a plain view schematically showing one example of a pressure sensor in accordance with a first embodiment of the present invention.

FIGS. 1A and 1B are drawings that schematically show a first embodiment of the pressure sensor of the present invention. FIG. 1A cross-sectional view, while FIG. 1B is a plan view. FIG. 1A shows a cross section along line L-L shown in FIG. 1B. That is, FIG. 1B is a surface 11a in which the diaphragm part 13 is provided. Note that FIG. 1B illustrates only a semiconductor substrate 11, a first cavity portion 12, and a second cavity portions 16.

The pressure sensor 10A according to the first embodiment shown in FIGS. 1A and 1B are constituted from a semiconductor substrate 11, a first cavity portion 12 that spreads out approximately parallel with one surface 11a of the semiconductor substrate 11 in the interior of a central region a thereof, a diaphragm portion 13 of a thin plate shape that is positioned on one side 12a of the first cavity portion 12, a pressure sensitive element 14 that is disposed on the diaphragm portion 13, and a bump 15 that is disposed in an outer edge region β of the one surface 11a of the semiconductor substrate 11 that excludes the diaphragm portion 13 and is electrically connected with the pressure sensitive element 14, in which a second cavity portion 16 is disposed in at least one portion of the outer edge region β in the interior of the semiconductor substrate 11 and closed with respect to the one surface 11a of the semiconductor substrate 11. In the present embodiment, this second cavity portion 16 is disposed at a position that overlaps at least the bump 15 when viewed from the one surface 11a of the semiconductor substrate 11. These are described in detail below.

The semiconductor substrate 11 may be constituted from a silicon wafer or the like. Inside of this semiconductor substrate 11, the first cavity portion 12 is formed in a central region a of the one surface 11a of the semiconductor substrate 11, and the diaphragm portion 13 shaped as a thin plate is formed between the one surface 11a of the semiconductor substrate 11 and this first cavity portion 12. Also, the second cavity portion 16 is formed in the outer edge region β of the one surface 11a of the semiconductor substrate 11. Stress that is applied to the pressure sensor 10 other than the pressure to be measured is relieved by this second cavity portion 16 and a thin plate portion 11c that is between the second cavity portion 16 and the one surface 11a of the semiconductor substrate 11, and therefore suppresses the stress from exerting an effect on the diaphragm portion 13.

The first cavity portion 12 indicates a space that is formed on the side of the one surface 11a of the semiconductor substrate 11. The first cavity portion 12 in the present invention is an encapsulated type first cavity portion 12 that exposes a one surface 13a of the diaphragm portion 13 in an enclosed space within the semiconductor substrate 11. The size of the first cavity portion 12 can be suitably adjusted so that the diaphragm portion 13 becomes the desired thickness.

The shape of the diaphragm portion 13 is not particularly limited provided a linear proportional relation between pressure and electrostatic capacity is obtained within the load pressure range of the measuring object. Accordingly, the shape of the diaphragm portion 13 may be rectangular, square, or circular. In the present embodiment, it is assumed to be rectangular.

Figure 2:
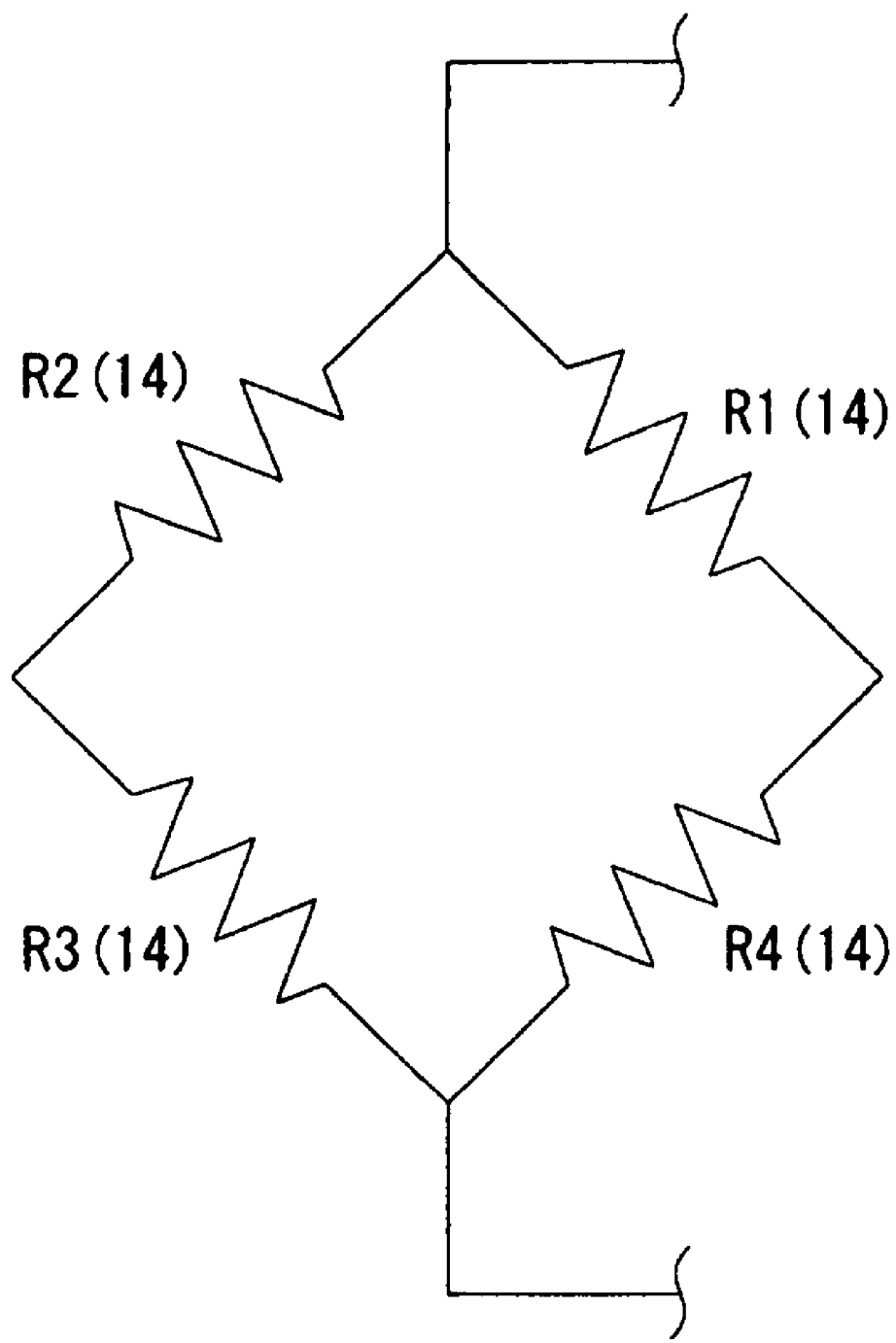
FIG. 2 is an electrical wiring diagram of the pressure sensitive element.

The pressure sensitive element 14 consists of gauge resistors (R1 to R4) that are disposed at the outer edge portion of the diaphragm portion 13, and the output signal changes in accordance with the degree of curvature of the diaphragm portion 13, whereby pressure is detected. FIG. 2 is an electrical wiring diagram of the pressure sensitive element 14. As shown in FIG. 2, these gauge resistors (R1 to R4) are electrically connected so as to constitute a Wheatstone bridge via lead wires not illustrated. Since both stresses of compression and tension are easily applied to the pressure sensitive element 14 at a periphery portion of the diaphragm portion 13, the highly sensitive pressure sensor 10 is obtained.

Also, the installation location of the pressure sensitive element 14, besides being embedded in the one surface 11a of the semiconductor substrate 11 in the vicinity of the diaphragm portion 13 as in the embodiment above, may be placed at any location provided it is a location that can detect the curvature of the diaphragm portion 13. Therefore, the pressure sensitive element 14 may be formed so as to project above the one surface 11a of the semiconductor substrate 11, for example.

The bump 15 electrically connects the pressure sensor 10 with another base such as a laminated substrate. The bump 15 is not particularly limited. By electrically connecting the pressure sensor 10 with another base such as a laminated substrate via the bump 15, a separation portion is formed between the base and the pressure sensor 10. Since the pressure sensor 10 directly does not receive stress from the laminated substrate or the like by the arrangement of the separation portion in the way, it is possible to relieve the stress.

The second cavity portion 16 is a closed space within the semiconductor substrate 11, and is disposed in the outer edge region β of the one surface 11a of the semiconductor substrate 11. The size of the second cavity portion 16 is not particularly limited but may be preferably adjusted in accordance with the corresponding pressure sensor 10 provided it is capable of relieving the stress to be applied to the pressure sensor 10 and pressures to be measured. If the height of the second cavity portion 16 and the position in the thickness direction of the semiconductor substrate 11 are made the same as the first cavity portion 12, it is possible to form the first cavity portion 12 and the second cavity portion 16 in the same process, which is preferred.

Also, the shape of the second cavity portion 16 is a square pillar in the present embodiment, but is not particularly limited to this shape. For example, as shown in FIGS. 3A and 3B it may have a cylindrical column shape or a polygonal column shape. Also, the end portions of the second cavity portion 16 may be curved as in the pressure sensor obtained from the manufacturing method of FIGS. 7A to 7D. By modifying the design of the shape of the second cavity portion 16 in accordance with the magnitude and direction of the stresses to be applied to the pressure sensor 10, it is possible to obtain a pressure sensor that can more effectively relieve stress and in which characteristic fluctuations hardly occur.

According to the pressure sensor 10A of the first embodiment, by providing the second cavity portion 16 within the semiconductor substrate 11 and in the outer edge region β of the one surface 11a of the semiconductor substrate 11, it is possible to relieve stress from the outside that is transmitted via the bumps 15 and pressures to be measured. In particular, when mounting the pressure sensor 10A of the present invention on a typical FR4 substrate made of glass epoxy resin or the like, since the difference of CTE between this substrate and the semiconductor substrate 11 is large, thermal stress due to the surrounding temperature change and residual stress occur via the bumps 15. When this happens, the thin plate portion 11c of the semiconductor substrate 11 between the bump 15 and the second cavity portion 16 and the second cavity portion 16 serve as stress buffer portions, whereby it is possible to relieve these stresses. Also, it is possible to relieve the effects of stresses due to deformation of the semiconductor substrate 11 and vibration, dropping, or the like of the pressure sensor 10A.

As shown in the present embodiment, by arranging this second cavity portion 16 at a location that overlaps the bump 15 when viewed from the side of the one surface 11a of the semiconductor substrate 11, it is possible to more effectively relive stresses that have been applied to the bump 15. Accordingly, it is possible to suppress the impact of such stresses on the output characteristics of the pressure sensor 10A and possible to obtain a pressure sensor 10A that maintains desired output characteristics.

Second Embodiment

FIGS. 3A and 3B schematically show a pressure sensor 10B that relates to a second embodiment of the present invention. FIG. 3A is a cross-sectional view, while FIG. 3B is a plan view. FIG. 3A shows a cross section along line L-L shown in FIG. 3B. That is, FIG. 3B is a surface 11a in which the diaphragm portion 13 is provided. Note that FIG. 3B illustrates only a semiconductor substrate 11, a first cavity portion 12, and a second cavity portion 26.

The point in which the pressure sensor 10B of the present embodiment differs from the pressure sensor 10A of the first embodiment is the point of the shape of the second cavity portion 26 being cylindrical column. Those parts that are the same as the first embodiment are denoted by the same reference numerals, with descriptions thereof being omitted.

By changing the shape of the second cavity portion 26 in this manner, the propagation of stresses to the diaphragm portion 13 differs, and it is possible to enable further relieving of stresses that are transmitted via the bumps 15.

In particular, by making the shape of the second cavity portion 26 in cylindrical column, projection portions in which stresses concentrate in the second cavity portion 26 are eliminated, and so it is possible to more effectively disperse stresses that are applied to the pressure sensor 10B.

Third Embodiment

Figure 4A:
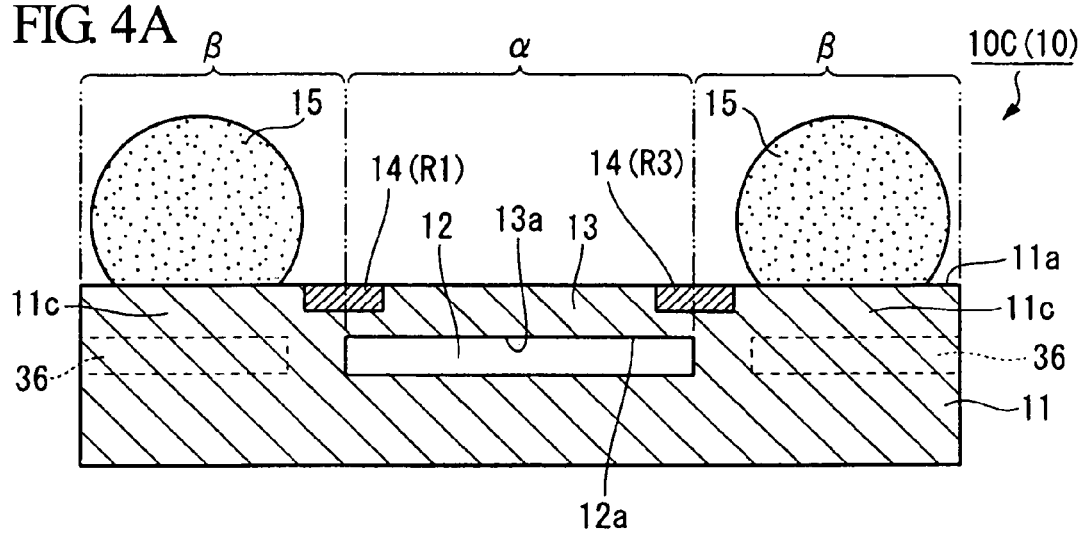
FIG. 4A is a cross-sectional view schematically showing one example of a pressure sensor in accordance with a third embodiment of the present invention.
Figure 4B:
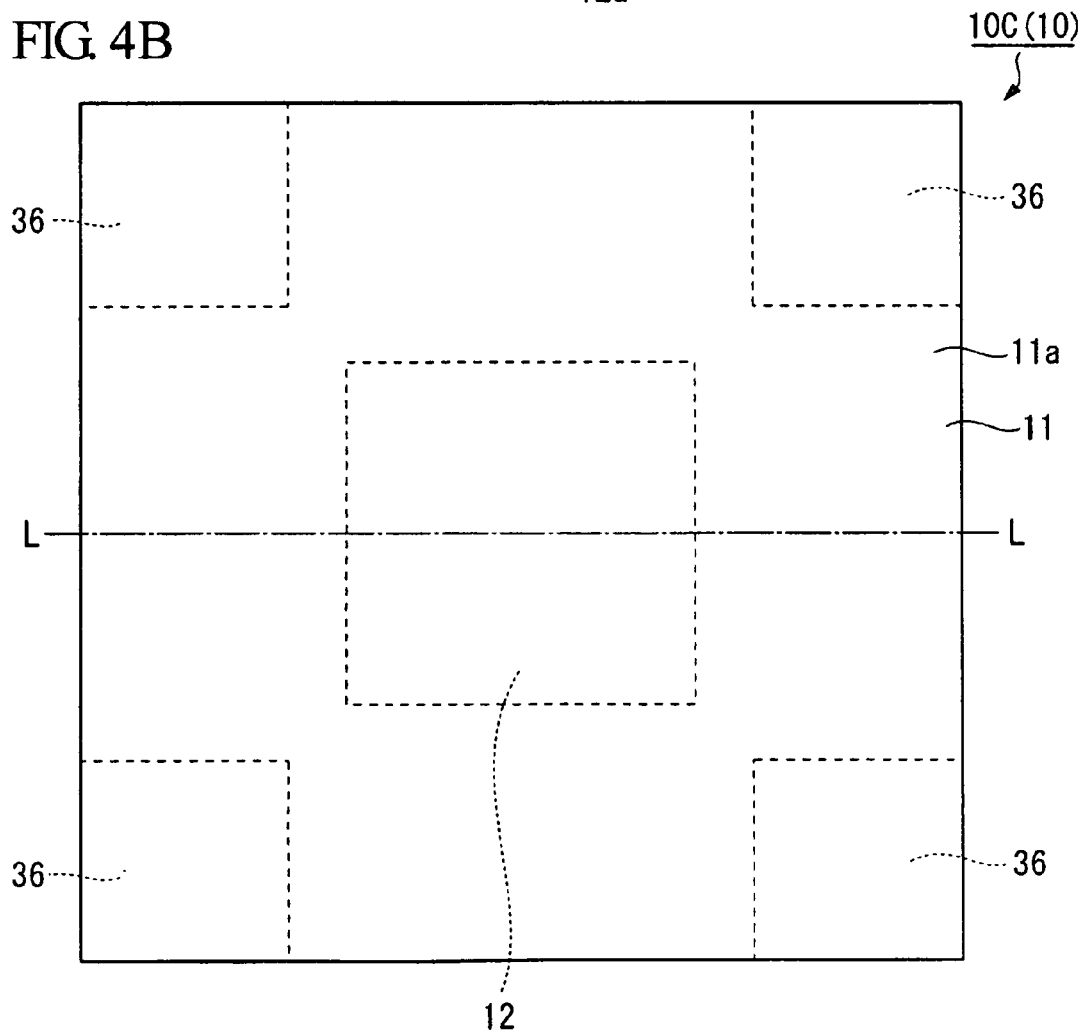
FIG. 4B is a plain view schematically showing one example of a pressure sensor in accordance with a third embodiment of the present invention.

FIGS. 4A and 4B schematically show a pressure sensor 10C that relates to a third embodiment of the present invention. FIG. 4A is a cross-sectional view, while FIG. 4B is a plan view. FIG. 4A shows a cross section along line L-L shown in FIG. 4B. That is, FIG. 4B is a surface 11a in which the diaphragm portion 13 is provided. Note that FIG. 4B illustrates only a semiconductor substrate 11, a first cavity portion 12, and a second cavity portion 36.

The point in which the pressure sensor 10C of the present embodiment differs from the pressure sensor 10A of the first embodiment is the point of the second cavity portion 36 opening to a side surface 11d of the semiconductor substrate 11. Those parts that are the same as the first embodiment are denoted by the same reference numerals, with descriptions thereof being omitted.

In the present embodiment, the second cavity portion 36 is disposed extending until the side surface 11d of the semiconductor substrate 11. Therefore, it is possible to obtain an even greater stress relief effect without the portion that supports the thin plate portion 11c on the side of the side surface 11d of the semiconductor substrate 11.

Fourth Embodiment

Figure 5A:
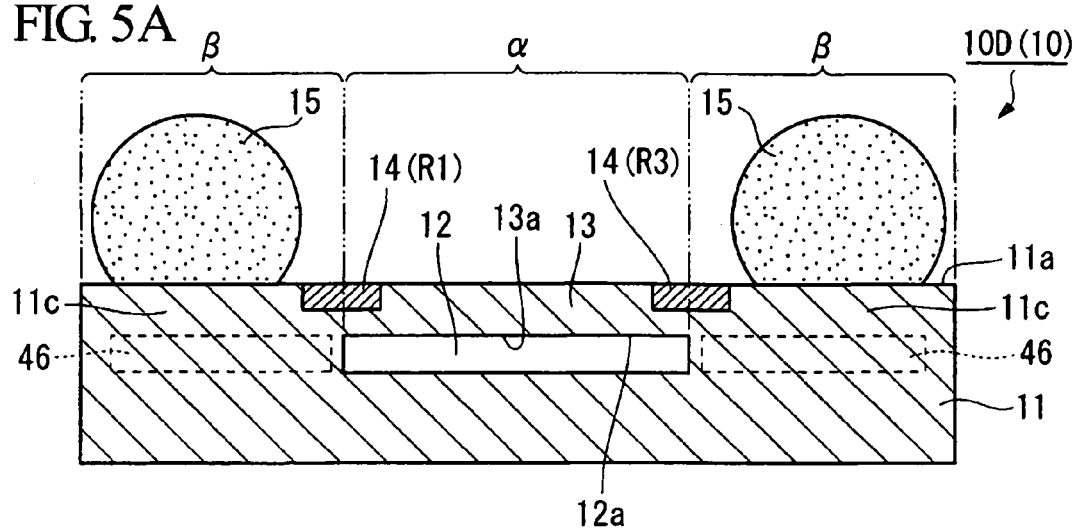
FIG. 5A is a cross-sectional view schematically showing one example of a pressure sensor in accordance with a fourth embodiment of the present invention.
Figure 5B:
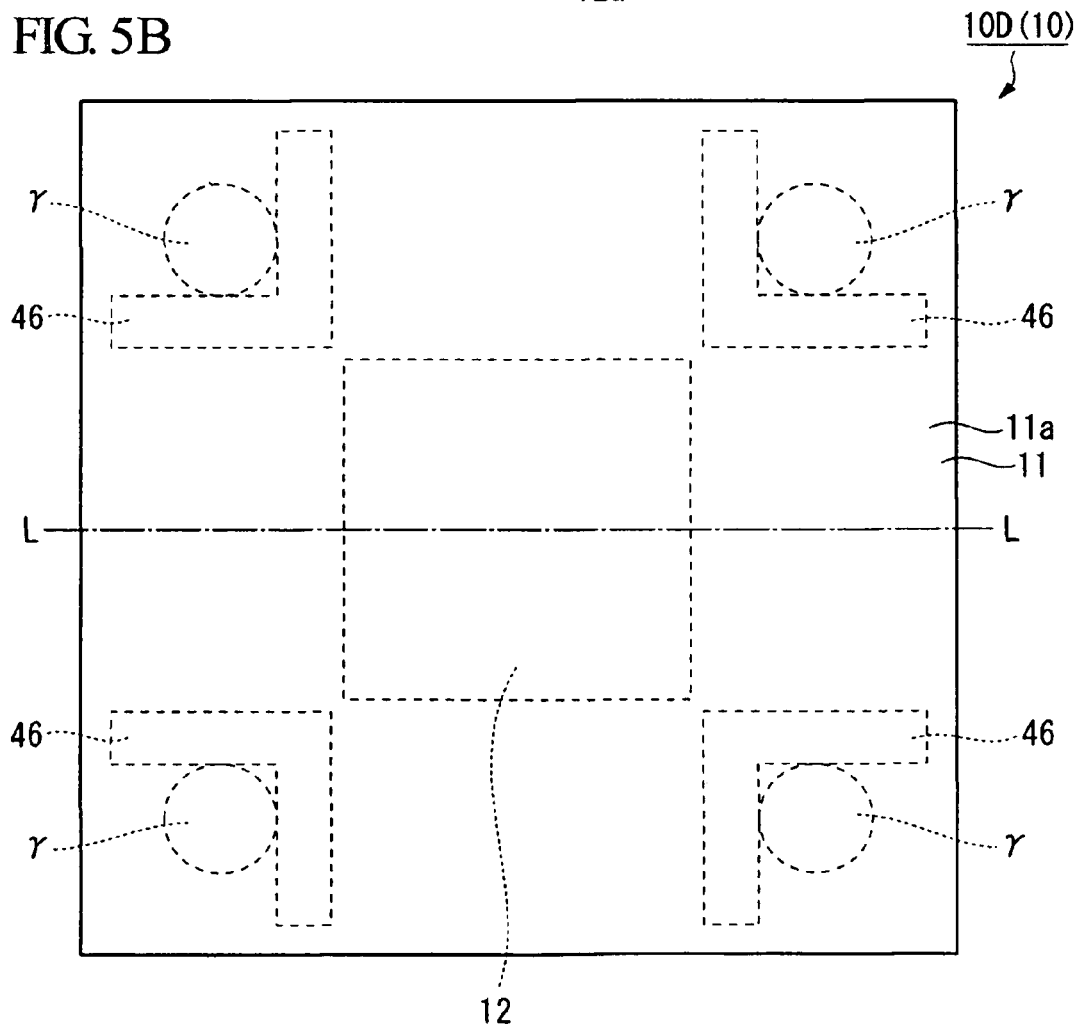
FIG. 5B is a plain view schematically showing one example of a pressure sensor in accordance with a fourth embodiment of the present invention.

FIGS. 5A and 5B schematically show a pressure sensor 10D that relates to a fourth embodiment of the present invention. FIG. 5A is a cross-sectional view, while FIG. 5B is a plan view. FIG. 5A shows a cross section along line L-L shown in FIG. 5B. That is, FIG. 5B is a surface 11a in which the diaphragm portion 13 is provided. Note that FIG. 5B illustrates only a semiconductor substrate 11, a first cavity portion 12, and a second cavity portion 46.

The point in which the pressure sensor 10D of the present embodiment differs from the pressure sensor 10A of the first embodiment is the point of the second cavity portion 46 being disposed between the diaphragm portion 13 and a region γ of the semiconductor substrate 11 directly under the bump 15. Those parts that are the same as the first embodiment are denoted by the same reference numerals, with descriptions thereof being omitted.

By disposing the second cavity portion 46 in the manner of the present embodiment, there is an effect of shutting off the route through which stress that occurs directly below the bump 15 propagates to the diaphragm portion 13. For this reason, since it is possible to more effectively suppress the impact of stresses transmitted via the bump 15 on the diaphragm portion 13, it is possible to obtain a pressure sensor 10A that is capable of maintaining desired output characteristics with changes hardly occurring in the output characteristics of the pressure sensor 10D.

Fifth Embodiment

Figure 6A:
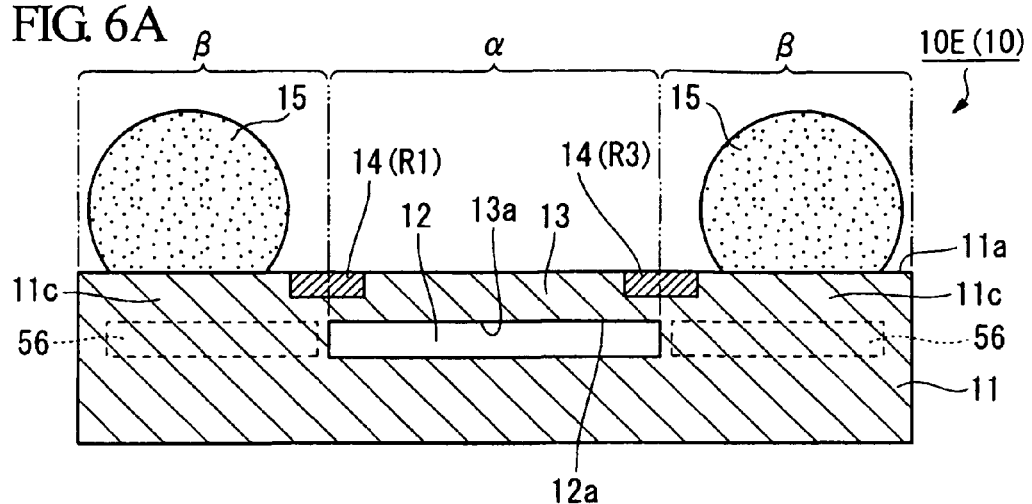
FIG. 6A is a plain view schematically showing one example of a pressure sensor in accordance with a fifth embodiment of the present invention.
Figure 6B:
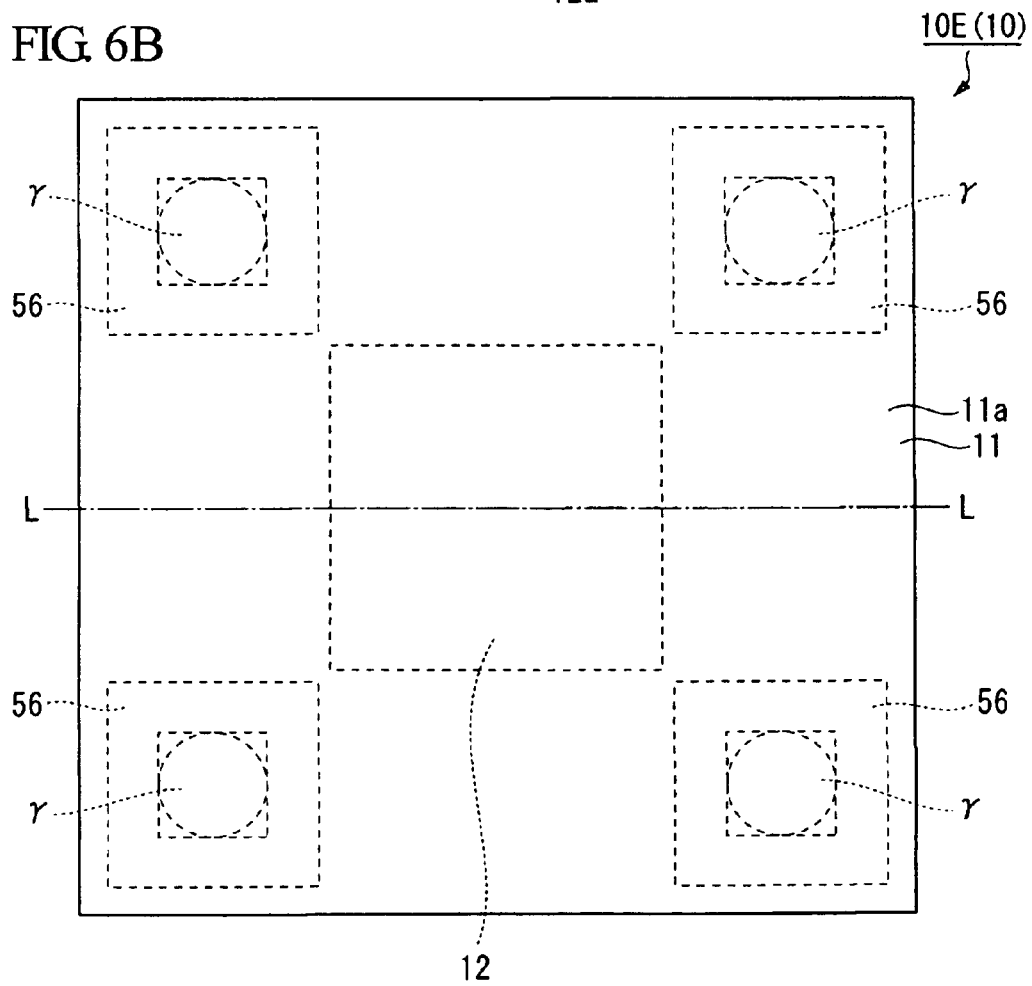
FIG. 6B is a cross-sectional view schematically showing one example of a pressure sensor in accordance with a fifth embodiment of the present invention.

FIGS. 6A and 6B schematically show a pressure sensor 10E that relates to a fifth embodiment of the present invention. FIG. 6A is a cross-sectional view, while FIG. 6B is a plan view. FIG. 6A shows a cross section along line L-L shown in FIG. 6B. That is, FIG. 6B is a surface 11a in which the diaphragm portion 13 is provided. Note that FIG. 6B illustrates only a semiconductor substrate 11, a first cavity portion 12, and a second cavity portion 56.

The point in which the pressure sensor 10E of the present embodiment differs from the pressure sensor 10A of the first embodiment is the point of the second cavity portion 56 being disposed so as to surround a region γ of the semiconductor substrate 11 directly under the bump 15. Those parts that are the same as the first embodiment are denoted by the same reference numerals, with descriptions thereof being omitted.

In this embodiment, it is possible to shut off the route through which stress that occurs directly below the bump 15 propagates to the diaphragm portion 13 and effectively reduce stress that occurs in the bump 15.

Also, by disposing this second cavity portion 56 so as to open to the side surface 11d of the semiconductor substrate 11, it is possible to achieve greater relief of stress that is transmitted via the bump 15 as described in the third embodiment.

[Method of Manufacturing the Pressure Sensor]

FIGS. 7A to 7D are sectional process drawings that schematically show one example of the method of manufacturing the pressure sensor 10.

A number of methods of manufacturing the cavity portions in the semiconductor substrate 11 have been reported, including for example the report by S. Armbruster et al. ("A novel Micromachining Process for the Fabrication of Monocrystalline SI-Membranes Using Porous Silicon", Digest of Technical Papers Transducers, March 2003, pp. 246).

Figure 7A:
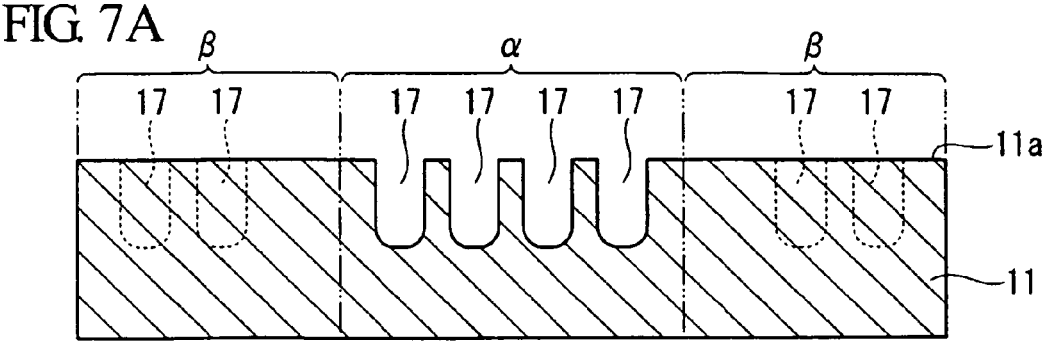
FIG. 7A is a sectional process drawing that schematically shows one example of a method of manufacturing the pressure sensor of the present invention.

First, as shown in FIG. 7A, vertical holes 17 that are perpendicular with respect to the thickness direction of the semiconductor substrate 11 are formed in the one surface 11a of the semiconductor substrate 11. The method of forming the vertical holes 17 is not particularly limited, and can be carried out with a publicly known method.

Figure 7B:
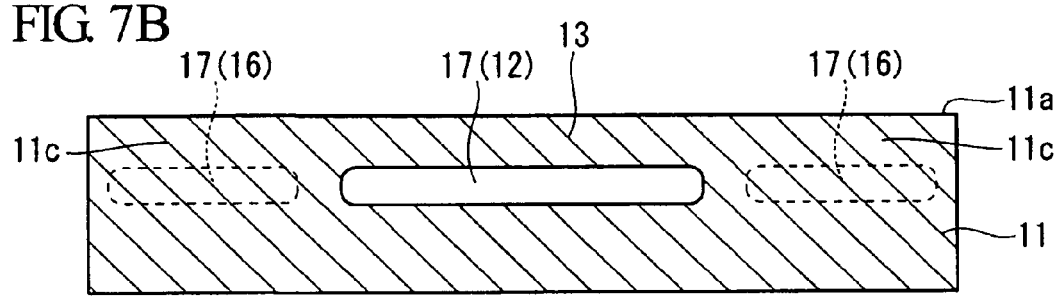
FIG. 7B is a sectional process drawing that schematically shows one example of a method of manufacturing the pressure sensor of the present invention.

Next, as shown in FIG. 7B, a reaction occurs within the semiconductor substrate 11 as a result of performing a heat treatment under certain conditions, and it is possible to form the first cavity portion 12 and the second cavity portion 16 within the semiconductor substrate 11 as shown in FIG. 7B.

When forming the vertical holes 17 and performing the heat treatment, if designed so that the distance and size of the first cavity portion 12 and the second cavity portion 16 become optimal values, it is possible to form the first cavity portion 12 and the second cavity portion 16 as two respectively independent cavities in one formation process.

Figure 7C:
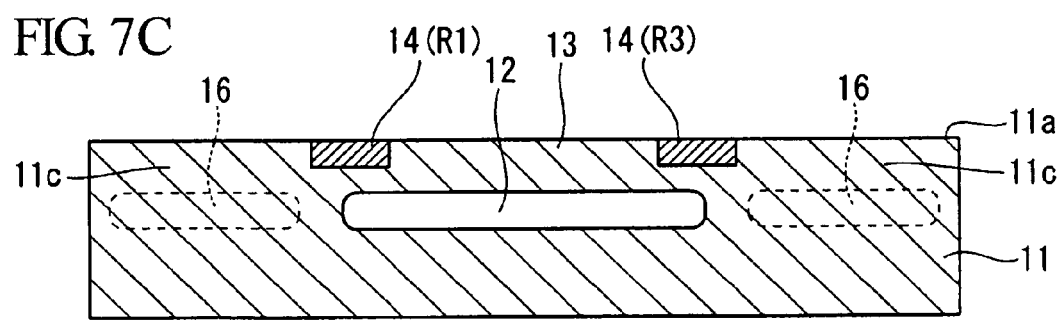
FIG. 7C is a sectional process drawing that schematically shows one example of a method of manufacturing the pressure sensor of the present invention.

Next, as shown in FIG. 7C, pressure sensitive elements 14 (for example, piezoresistance) are formed in the vicinity of the diaphragm 13 in the one surface 11a of the semiconductor substrate 11. The method of forming the pressure sensitive elements 14 (piezoresistance) is not particularly limited, and may be formed using a conventional publicly known method. For example, they may be formed by injecting a diffusion source such as boron in the silicon substrate 11. When doing so, the pressure sensitive elements 14 are formed so as to constitute a Wheatstone bridge as shown in FIG. 2.

Figure 7D:
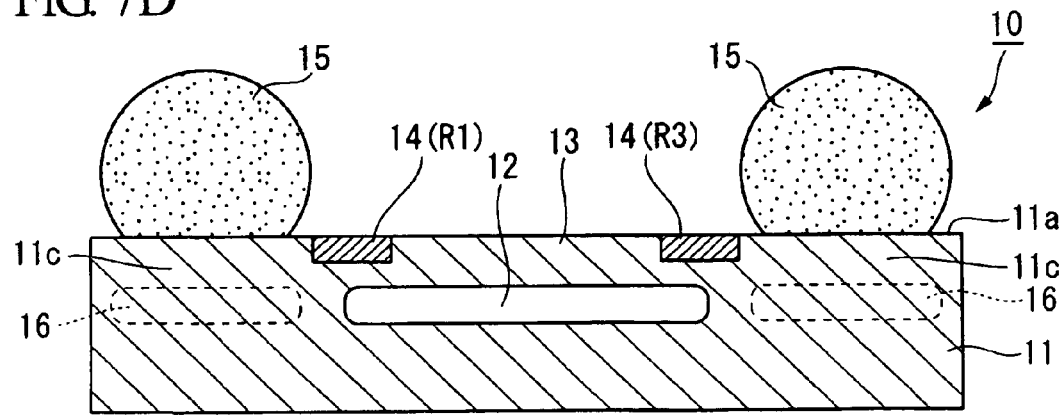
FIG. 7D is a sectional process drawing that schematically shows one example of a method of manufacturing the pressure sensor of the present invention.

Then, as shown in FIG. 7D, the bumps 15 are formed in the outer edge portion P on the one surface 11a of the silicon substrate 11. In this way, the pressure sensor 10 of the present invention is obtained.

According to the manufacturing method of the present invention, since the first cavity portion 12 and the second cavity portion 16 can be fabricated in the same process, manufacturing is possible without any change from the processes to produce a conventional pressure sensor that does not include the second cavity portion 16. Therefore, it is possible to easily manufacture the pressure sensor 10 without requiring any special equipment or tools.

FIGS. 8A to 8E are sectional process drawings that schematically show another example of the method of manufacturing the pressure sensor 10.

Figure 8A:
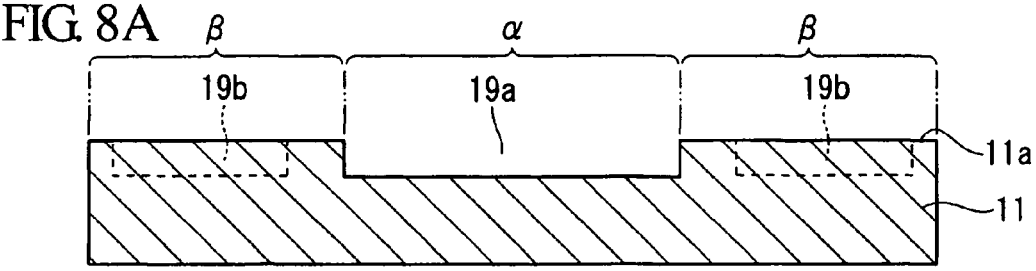
FIG. 8A is a sectional process drawing that schematically shows another example of a method of manufacturing the pressure sensor of the present invention.

First, as shown in FIG. 8A, in the one surface 11a of the semiconductor substrate 11, a first recess portion 19a that becomes the first cavity portion 12 is formed in the central region α, and a second recess portion 19b that becomes the second cavity portion 16 is formed in the outer edge portion β. The method of forming these first cavity portion 19a and second cavity portion 19b is not particularly limited, and they may be formed by plasma etching with $SF_6$ gas, a laser, and wet etching and the like.

Figure 8B:
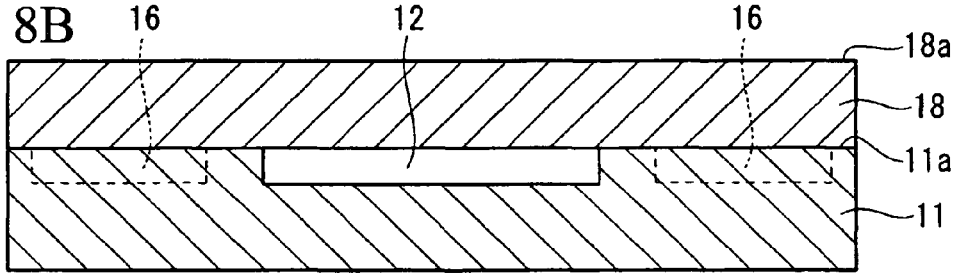
FIG. 8B is a sectional process drawing that schematically shows another example of a method of manufacturing the pressure sensor of the present invention.
Figure 8C:
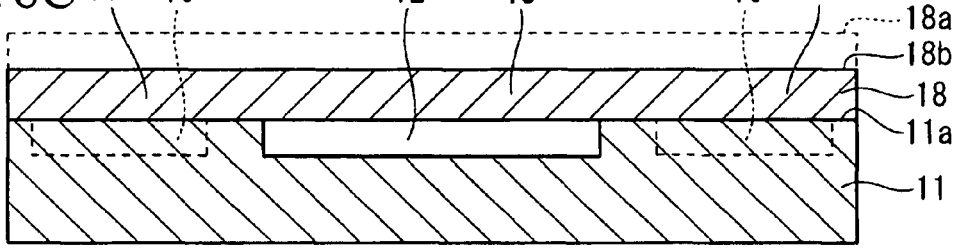
FIG. 8C is a sectional process drawing that schematically shows another example of a method of manufacturing the pressure sensor of the present invention.

Next, as shown in FIG. 8B, another semiconductor substrate 18 is bonded onto the one surface 11a of the semiconductor substrate 11. As the other semiconductor substrate 18, it is possible to use the same composition as the semiconductor substrate 11. Thereafter, as shown in FIG. 8C, a one surface 18a of the other semiconductor substrate 18 is thinned by grinding or the like to the desired thickness to form the diaphragm portion 13.

Figure 8D:
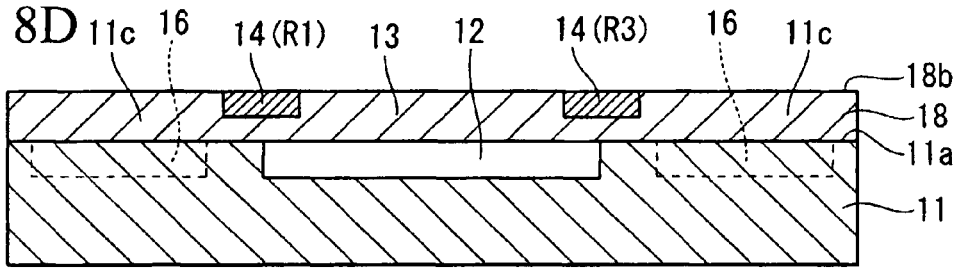
FIG. 8D is a sectional process drawing that schematically shows another example of a method of manufacturing the pressure sensor of the present invention.

Thereafter, as shown in FIG. 8D, the pressure sensitive elements 14 (for example, piezoresistance) are formed on the one surface 18a of the other semiconductor substrate 18 that has been thinned. The method of forming the pressure sensitive elements 14 (for example, piezoresistance) is not particularly limited, and may be formed using a conventional publicly known method. For example, they may be formed by injecting a diffusion source such as boron in the silicon substrate (the other semiconductor substrate 18). When doing so, the pressure sensitive elements 14 are disposed so as to constitute a Wheatstone bridge as shown in FIG. 2.

Figure 8E:
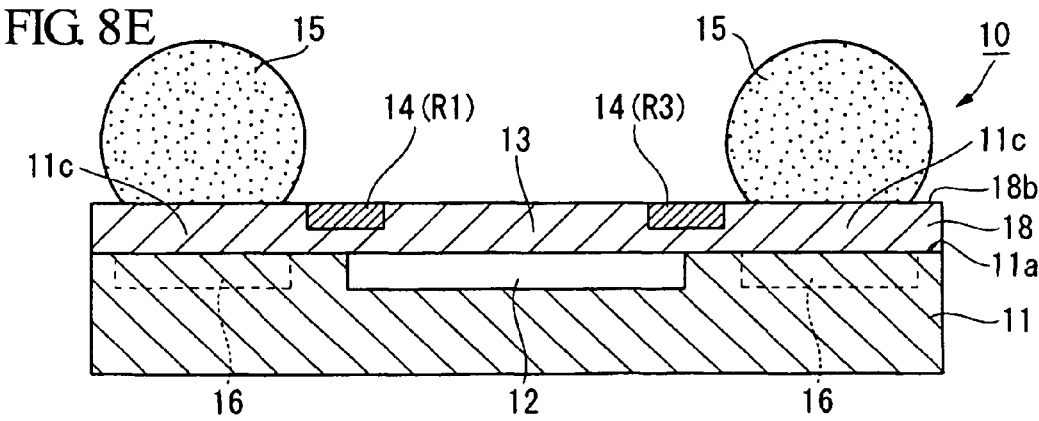
FIG. 8E is a sectional process drawing that schematically shows another example of a method of manufacturing the pressure sensor of the present invention.
Figure 9A:
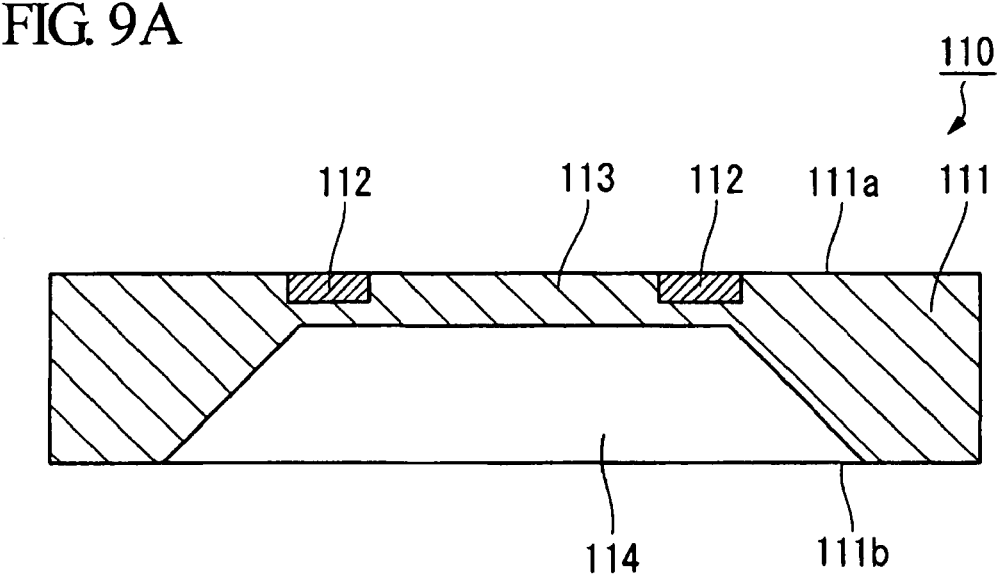
FIG. 9A is a sectional view that schematically shows one example of a conventional pressure sensor.
Figure 9B:
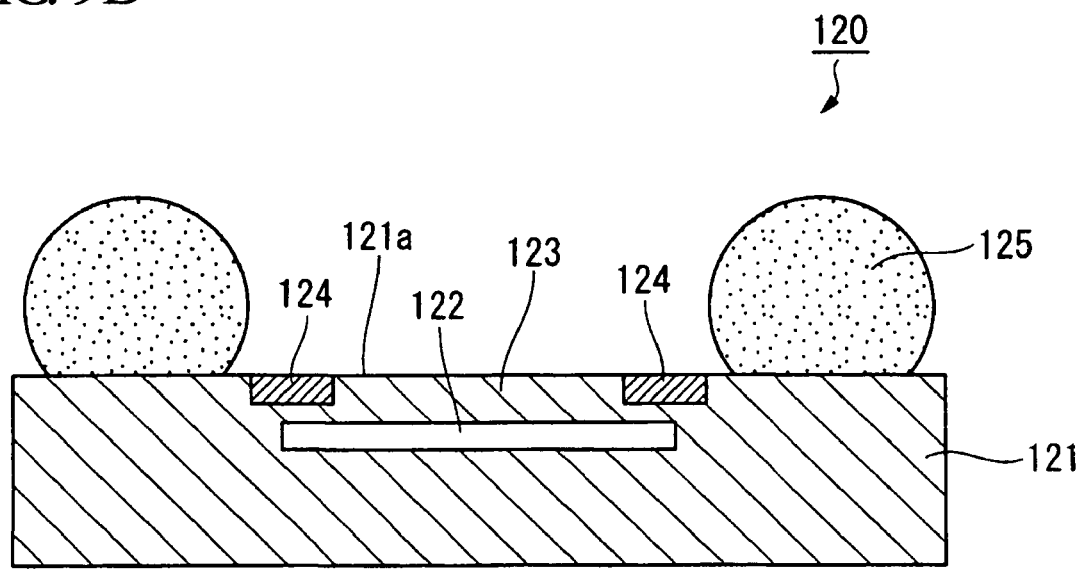
FIG. 9B is a sectional view that schematically shows one example of a conventional pressure sensor.

Then, as shown in FIG. 8E, the bumps 15 are formed in the outer edge portion β on the other semiconductor substrate 18. In this way, the pressure sensor of the present invention is obtained.

According to the manufacturing method of the present invention, since the first cavity portion 12 and the second cavity portion 16 can be fabricated in the same process, manufacturing is possible without any change from the processes to produce a conventional pressure sensor that does not include a second cavity portion 16. Therefore, it is possible to easily manufacture the pressure sensor 10 without requiring any special equipment or tools.

Also, the electronic component of the present invention is provided with the pressure sensor that is disclosed in any of the above-described first embodiment to fifth embodiment. Accordingly, when mounting the pressure sensor of the present invention, the residual stress and thermal stress after mounting are relieved. Therefore, since the electronic component is hardly affected by stress from outside via the bumps, it is possible to provide an electronic component that is capable of detecting pressure with high accuracy and good reproducibility.

The pressure sensor according to the present invention can provide a pressure sensor that maintains desired output characteristics and in which stress that is applied to the pressure sensor is relieved. Therefore, it is suitable for various electronic devices that are used for applications of measuring, for example, pressures such as air pressure, water pressure, oil pressure, or the like and capable of measurement with high accuracy and good reproducibility.

What is claimed is:

1. A pressure sensor comprising:
a semiconductor substrate;
a first cavity portion that spreads out approximately parallel with one surface of the semiconductor substrate in the interior of a central region thereof;
a diaphragm portion of a thin plate shape that is positioned on one side of the first cavity portion;
a pressure sensitive element that is disposed on the diaphragm; and
a bump that is disposed in an outer edge region of the one surface of the semiconductor substrate that excludes the diaphragm portion and is electrically connected with the pressure sensitive element, wherein
a second cavity portion is disposed in at least one portion of the outer edge region in the interior of the semiconductor substrate and is closed with respect to the one surface of the semiconductor substrate.

2. The pressure sensor according to claim 1, wherein the second cavity portion is disposed at a position that overlaps at least the bump when viewed from the one surface of the semiconductor substrate.

3. The pressure sensor according to claim 2, wherein the second cavity portion opens to a side surface of the semiconductor substrate.

4. The pressure sensor according to claim 1, wherein the second cavity portion is disposed between the diaphragm portion and the region where the solder bump is disposed.

5. The pressure sensor according to claim 4, wherein the second cavity portion is disposed in the interior of the semiconductor substrate so as to surround the region where the solder bump is disposed on the one surface of the semiconductor substrate.

6. An electronic component which is mounted with the pressure sensor recited in any one of claims 1 to 5.

7. A method of manufacturing a pressure sensor including: a semiconductor substrate; a first cavity portion that spreads out approximately parallel with one surface of the semiconductor substrate in the interior of a central region thereof; a diaphragm portion of a thin plate shape that is positioned on one side of the first cavity portion; a pressure sensitive element that is disposed on the diaphragm; and a bump that is disposed in an outer edge region of the one surface of the semiconductor substrate that excludes the diaphragm portion and is electrically connected with the pressure sensitive element, wherein a second cavity portion is disposed in at least one portion of the outer edge region in the interior of the semiconductor substrate and is closed with respect to the one surface of the semiconductor substrate, comprising:
   forming the first cavity portion, the second cavity portion, and the diaphragm portion in the semiconductor substrate;
   forming the pressure sensitive element on the diaphragm portion; and
   forming the solder bump that is electrically connected to the pressure sensitive element on the one surface of the semiconductor substrate.

* * * * *